United States Patent [19]

Culver et al.

[11] Patent Number: 4,905,378

[45] Date of Patent: Mar. 6, 1990

[54] CENTRALIZING COUNTERSINK GAUGE

[75] Inventors: Raymond F. Culver; Sudershan K. Khurana, both of Marietta, Ga.

[73] Assignee: Lockheed Corporation, Calabasas, Calif.

[21] Appl. No.: 769,113

[22] Filed: Aug. 26, 1985

[51] Int. Cl.$^4$ .............................................. G01B 3/32
[52] U.S. Cl. ...................................... 33/836; 33/531; 33/833; 33/542
[58] Field of Search ............. 33/172 R, 169 B, 169 C, 33/172 D, 531, 542, DIG. 18, 836, 832, 833

[56] References Cited

U.S. PATENT DOCUMENTS

| | | | |
|---|---|---|---|
| 1,617,485 | 2/1927 | Hughes | 33/172 R |
| 1,768,639 | 7/1930 | Shore et al. | 33/172 R |
| 2,514,794 | 7/1950 | Prince | 33/189 B |
| 2,632,955 | 3/1953 | Samuelson | 33/169 B |
| 2,642,670 | 6/1953 | Dow | 33/172 R |
| 2,741,032 | 4/1956 | Emery | 33/172 R |
| 2,758,382 | 8/1956 | Hurd | 33/172 R |
| 3,109,243 | 11/1963 | McCormick | 33/542 |
| 3,162,953 | 12/1964 | Porter | 33/542 |
| 3,352,021 | 11/1967 | Leach et al. | 33/542 |
| 3,936,945 | 2/1976 | Jevremov | 33/169 B |
| 4,139,947 | 2/1979 | Possati | 33/178 E |

FOREIGN PATENT DOCUMENTS 260913 5/1971 U.S.S.R. ............................ 33/169 B

Primary Examiner—William A. Cuchlinski, Jr.
Assistant Examiner—Patrick R. Scanlon
Attorney, Agent, or Firm—Robert P. Barton; Eric R. Katz; Stanley L. Tate

[57] ABSTRACT

Disclosed is a measuring device for determining both absolute and comparative depths of the countersunk portions of countersunk holes drilled in a workpiece, the measuring device being capable of centering itself within a hole being measured so that repetitive measurements can be made early and accurately; further the measuring device is capable of measuring the depth of a countersunk hole through a template.

14 Claims, 4 Drawing Sheets

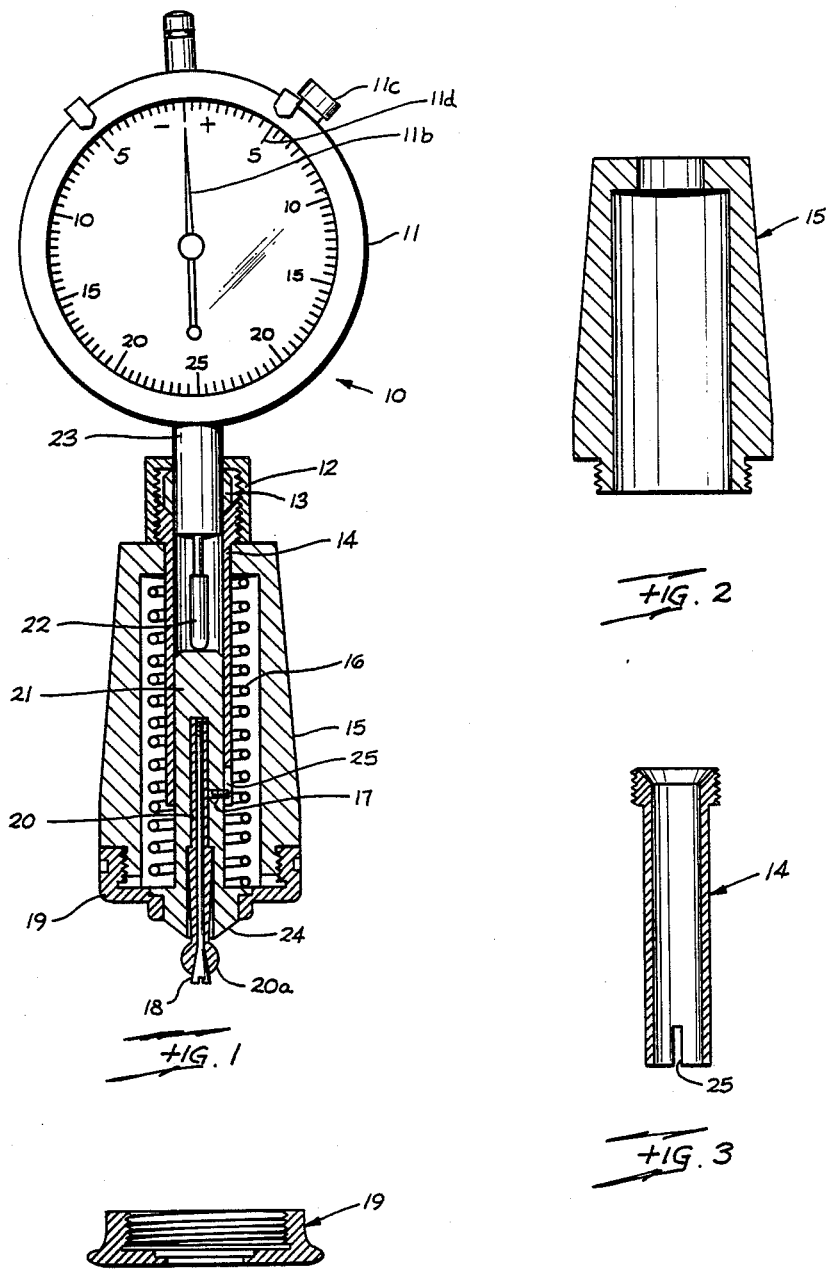

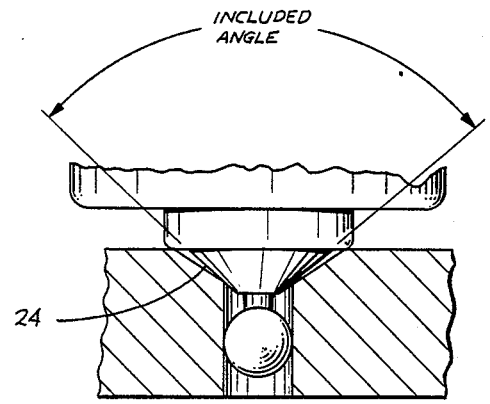
FIG. 10
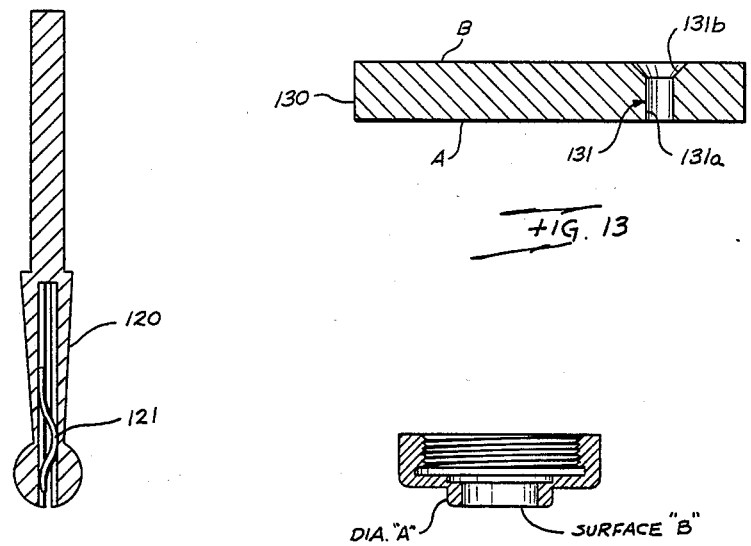
FIG. 12
FIG. 13
FIG. 15

CENTRALIZING COUNTERSINK GAUGE

TECHNICAL FIELD

This invention relates in general to measuring devices, and in particular, to a gauge for measuring the depth of the tapered portion of a hole having both a straight wall portion and a tapered wall portion.

BACKGROUND ART

Holes having both a straight wall portion and a tapered wall portion are commonly used in the aircraft industry and other industries where fasteners such as rivets are used to attach an outer skin to a frame. This is particularly true when aerodynamic requirements specify low turbulence and low drag across the surface of the skin being attached to the frame. When the body being fabricated must meet specifacations of low turbulence and low drag it is not enough to merely provide a fastener hole in the skin that is couter-sunk (a hole having portions wherein the side walls are straight and portions with tapered sidewalls) but the countersinking must be down to a precise depth and concentric with the straight wall of the hole so that the head of a fastener used in the hole will be exactly flush with the surface of the skin. If such is not the case, turbulence will be induced by the uneven skin surface as will drag because of the rough skin surface. In the past the absolute depth of the countersunk portion of a hole was not measured but instead fasteners were placed in holes and one by one the relative flushness of each fastener and the surface of the skin was measured. The device used to measure fastener flushness in this manner is expensive and the practice of the method is time consuming and costly because it is so labor-intensive.

Thus, it can readily be seen that the prior art methods of and apparatus for measuring the depth of the countersink portion of countersunk holes do not measure actual depth of the tapered portion of the hole and leave much to be desired both in terms of accuracy and efficiency. Disclosure of the Invention Accordingly, it is an object of the present invention to provide a gauge that can be used to measure directly and accurately the depth of the tapered portion of a countersunk hole.

It is also an object of the present invention to provide a gauge capable of measuring relative flushness of a countersunk hole directly and without requiring that a fastener be placed in the hole before such a measurement can be made.

The principal feature of the present invention is the provision of a unique selfcentering gauge for determining the dimensions of the tapered portion of a couatersunk hole which can be used with holes of various diameters. In accordance with the present invention a measuring device is provided which when used automatically centers itself in the countersunk hole being measured and can alternatively display either the actual depth to the countersunk portion of the hole or the relative flushness of a series of holes as compared to a standard depending on how zero setting is made. The measuring device is in the form of a hollow body which has attached to one end of a stem gauge, the stem portion of which extends into the hollow body and therein contacts one end of a probe, the other end of which forms a measuring surface. The probe is held inside the hollow body by a foot piece which is adapted to contact an annular ring which surrounds the measuring surface at its juncture with the main body of the probe. The probe is forced against the foot piece by a spring which surrounds the probe and an inner sleeve which surrounds the probe concentrically with slip fit and also serves as a part of the mechanism by which the stem gauge attaches to the hollow body. The slip fit between probe and inner sleeve eliminates the possibility of erroneous reading. An expandable centering device is attached to the apex of a conical measuring surface so that the measuring surface of the gauge is always positioned in the center of the countersunk portion of the hole being inspected.

An additional feature of the present invention is the ability of the gauge to be used to inspect holes of various diameters with equal accuracy without changing either the centralizing device or the probe measuring surface.

Another feature of the present invention is the ability of the measuring surface to automatically position itself so that contact between the gauge and the hole always occurs at the intersection of the tapered walls of the countersink and the straight walls of the hole.

Still another feature of the present invention is the ability of the gauge to determine and display either actual depth of the countersink or comparative depths based upon a calibration standard.

In accordance with the present invention the counter-sink measuring device comprises a hollow body of a stem gauge attached to one end of the hollow body so that the stem of the gauge extends into the exterior of the hollow body via an inner sleeve which houses the plunger position of the gauge and a probe. One end of the probe comprises a measuring surface in the shape of a truncated cone and which has been adapted to function as a collect holder which receives and holds the centralizer. The other end of the probe functions as a contact point for the stem gauge plunger and is held against the gauge plunger by a spring which surrounds the inner sleeve and the part of the probe extending therefrom. An annular ring machined into the measuring surface at the base of the truncated cone contacts a foot piece which threads onto the hollow body and which holds the probe and spring inside the hollow body. The foot piece contains a central aperture through which the measuring surface of the probe and the centralizer project so that the measuring surface and centralizer can be pressed into a hole so that the measuring surface always contacts the hole at the junction of the tapered walls of the countersink with the straight wall section of the hole.

In accordance with the present invention the measuring device also includes means for limiting the lateral movement of the measuring surface within the countersink.

Also in accordance with the present invention the centralizer comprises an elongated collect mounted on the probe and coaxial with the long axis thereof and which includes an expandable spherical member extending from the center of said measuring surface in combination with a mandrel, wedge shaped on one end and threaded into said collet so that as the mandrel is threaded into and out of the collet the wedge shaped end causes the spherical member to expand and contract respectively and further includes a means for firmly locking the collet and mandrel in the collet holder.

Also, in accordance with the present invention a foot is provided which allows the measuring device to be used to measure countersink depth when a template is mounted on a piece part without removing the template. If there is a discrepancy in depth when measured, necessary corrective action can be taken to improve the quality of holes, i.e. the adjustment of power or hand tool to control the depth of countersunk hole.

In accordance with the present invention the included angle of the conical measuring surface is less than the angle of taper of the countersunk portion of the hole so that contact between the measuring surface and the hole only occurs at the intersection of the vertical and tapered portions of the hole. The included angle of the conical measuring surface generally is from about 50 degrees to about 110 degrees, however, optional angle would be around 55 to 60 degrees if the hole is through and there is no obstruction at the back side of the piece part. In the aircraft industry the included angle will generally be less than 100 degrees.

In accordance with the present invention the measuring surface comprises a fluted truncated cone adapted to receive a centralizing member.

Also in accordance with the present invention the stem gauge includes an analog display means for displaying either the actual depth of the tapered portion of a hole or the comparative depth of the tapered portions of several holes as they compare to a standard, These and other objects, features and advantages of the present invention will become more readily apparent with a reading of the following more detailed description of the preferred embodiment in conjunction with accompanying drawings and claims. The drawings in which like reference characters indicate corresponding parts in all views are not necessarily to scale, emphasis instead being placed on illustrating the principles of the invention.

BRIEF DESCRIPTION OF THE DRAWINGS

FIG. 1 is a partial cross-sectional view of the assembled measuring device of the present invention.

FIG. 2 is a cross-sectional view of the outer sleeve.

FIG. 3 is a cross-sectional view of the inner sleeve.

FIG. 4 is a cross-sectional view of the foot.

FIG. 10 is a cross-sectional representation of the function of the measuring surface and centralizer with a countersunk hole being measured.

FIG. 12 is a cross-sectional view of another embodiment of an expandable centralizer.

FIG. 13 is a cross-sectional view of a calibrated test plate.

FIG. 15 is a cross:sectional view of a foot adapted for use with a template.

BEST MODE OF CARRYING OUT THE INVENTION

Figure 5:
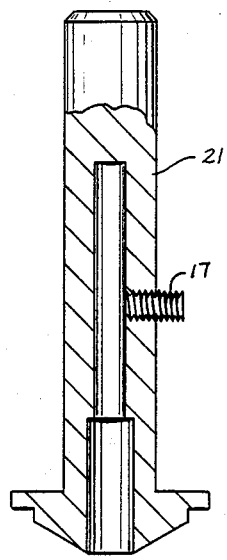
FIG. 5 is a cross-sectional view of the probe and measuring surface as used with an expandable centralizer.

Referring now to FIG. 1, which is a partial cross-sectional view of measuring device 10, which includes stem gauge 11, stem gauge fastener nut 12, ferrule 13, inner sleeve 14, body 15, spring 16, set screw 17, mandrel 18, foot 19, centralizer 20, probe 21, plunger 22, stem 23, and measuring surface 24. Measuring device 10 is used with non-expandable centralizer in FIG. 10. Expandable centralizer 20 is held in probe 21 by set screw 17 which also functions in cooperation with inner sleeve 14 to restrict radial motion of the probe 21 by extending into slot 25 which is cut into inner sleeve 14. Slot 25 is illustrated in more detail in FIG. 3.

Figure 6:
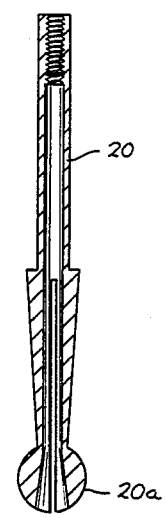
FIG. 6 is a cross-sectional view of an expandable centralizer.
Figure 7:
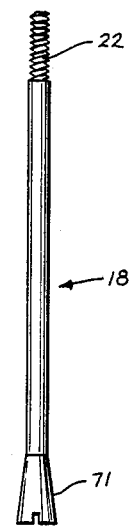
FIG. 7 is a partial cross-sectional view of the mandrel used with an expandable centralizer.
Figure 8:
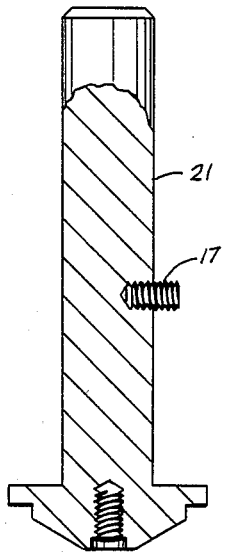
FIG. 8 is a cross-sectional view of the probe and measuring surface as used with a non-expandable centralizer.

In one embodiment mandrel 18 is constructed to thread into centralizer 20 so that as mandrel 18 extends further into centralizer 20 tapered head 71 causes the spherical head 20a to expand. This feature assures the user of precise centering of the measuring because the head 20a can be made to correspond with the diameter of the straight portion of the hole being measured by merely threading mandrel 18 into or out of probe 21. Set screw 17 extends through centralizer 20 and can be tightened against mandrel 18 so that the mandrel is secure. FIG. 12 shows an alternate view of an expandable centralizer 120 which comprises a leaf spring 121 which presses firmly against the sides of expandable centralizer 20 or 120. This design does not require a mandrel. FIG. 6 illustrates an expandable centralizer 20 in more detail and its operation in cooperation with a mandrel 18 of the type illustrated in FIG. 1 and FIG. 7.

Measuring device 10 is zeroed for making actual depth measurements by inserting centralizer 20 and measuring surface 24 into the straight walled portion 131a of a calibrated test hole 131 contained in test pate 130, FIG. 13, spring 16 is then compressed by pressing the device 10 until foot 19 is in contact with surface A. When foot 19 is in contact with surface A and indicator 11b, FIG. 1, deflects the analog display dial 11d of stem gauge 11 is rotated until the zero is directly beneath the point of indicator 11b and then locked into place by tightening nut 11c which was loosened to allow dial 11d to be moved. After device 10 is set to zero in this manner the actual depth of taper of a countersink is measured by the method previously described.

If it is desired to measure variation in the depth of the tapered portions of a series of countersunk holes, device 10 is set to zero by inserting centralizer 20 and measuring surface 24 into the tapered portion 131b of calibrated hole 131 which has been drilled in test plate 130. When centralizer 20 and measuring surface 24 are properly positioned in hole 131 the device is compressed until foot 19 contacts surface B of plate 130. While foot 19 is in contact with surface B nut 11c is loosened to allow dial 11b to rotate and the zero on dial 11d is placed under the point of indicator 11b. When the zero on dial 11d is under indicator 11b nut 11c is tightened and device 10 has been set to zero. The difference in tapered portion depth of a series of countersunk holes can now be measured by placing the centralizer 20 and measuring surface 24 in the hole to be measured so that centralizer 20 extends into the straight walled portion of the hole as in FIG. 10 and device 10 is compressed until foot 19 contacts the surface into which the holes have been drilled and the amount of indicator 11b deflection shown on dial 11d corresponds to the difference between the depth of the tapered portion of calibrated hole 131 and the hole being measured. This deflection indicates the amount by which the countersunk portion of the hole checked is shallower or deeper than that hole 131b.

Figure 9:
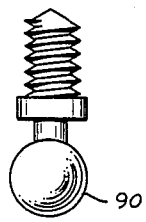
FIG. 9 is a side view of a non-expandable centralizer.
Figure 11:
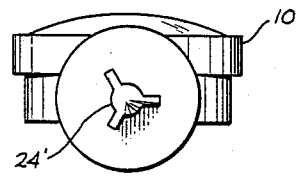
FIG. 11 is a view of an alternate embodiment of a measuring surface.
Figure 14:
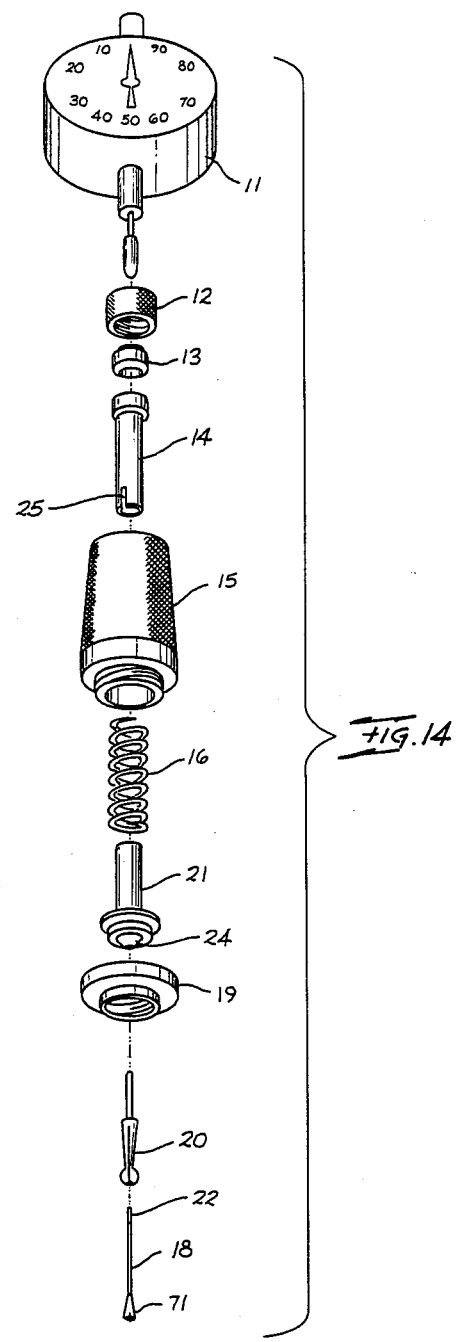
FIG. 14 is an exploded view to the measuring device of the present invention.

FIG. 11 represents an alternate embodiment of the truncated conical measuring surface 24 in which the measuring surface is a truncated fluted pyramid 24'. A probe 21 using this type measuring surface can also be drilled to accept an expandable centralizer 21 of the type shown in FIG. 1 and FIG. 6 or can use a nonexpandable centralizer 90 of the type shown in FIG. 9. Regardless of the type centralizer used, it is generally felt that it should have a spherical shape to prevent hangup on the walls of a hole being measured. The truncated design of the probe has an advantage as opposed to solid conical surface that if there is a burr or dust particle clinging at the intersection of tapered portion and straight portion of the hole, this design will allow measurement at three points letting the burr fall in the fluted area as opposed to circular line contact allowing the burr to cause the measured surface to creep which results in a measuring error.

FIG. 15 represents a cross-sectional view of a foot piece adapted for use with templates. This foot piece, when used with measuring device 10, permits an operator to read absolute depth of countersunk hole or comparative depth in cases where a template is in position on top of a piece part. The protruded diameter "A" is inserted in a template hole so that surface "B" would touch the surface of piece part around the countersunk hole when gauge 10 is pushed down to get a reading. Centralizer 20, when used in this situation, minimizes angularity when the gauge is pushed down thereby reducing measurement error.

Although the present invention has been discussed and described with primary emphasis on one preferred embodiment, it should be obvious that adaptations and modifications can be made thereto without departing from the spirit and scope of the invention.

We claim:

1. A measuring device for determining the dimensions of a tapered hole countersink depth of countersunk holes, each of said holes having a straight sidewall portion and a tapered portion, which comprises:
   a hollow body;
   a stem gauge attached to one end of said body so that the stem of said gauge extends into the interior of said body;
   a probe, one end of which comprises a measuring surface and the other end of which comprises a plunger contacting surface, mounted in said body whereby said plunger contacting surface is in constant contact with a plunger which projects through the stem of said gauge into said body;
   foot means having a central aperture for retaining said probe within said hollow body and for positioning said measuring surface for contact with a hole being measured;
   compression means for applying a constant load to said probe whereby the measuring surface projects through said central aperture of said foot means a pre-determined distance; and centralizing means for positioning said measuring surface in the center of the countersink.

2. The measuring device of claim 1 further comprising means for limiting lateral movement of said measuring surface within the countersunk being measured.

3. The measuring device of claim 2 wherein said means for limiting lateral movement of said measuring surface within the countersink comprises an elongated collet removably mounted in said probe with a spherical centralizing end extending immediately from the center of said measuring surface: a threaded wedge shaped mandrel positioned within said elongated collet so that as said mandrel is threaded into said elongated collet, said elongated collet expands.

4. The measuring device of claim 3 wherein said probe comprises a means for firmly holding said elongated collet and said mandrel, said means including an elongated collet holder. substantially cylindrical in shape, one end of which comprises said plunger contacting surface and the other end of which comprises a truncated comical measuring surface adapted to receive said elongated collet so that said spherical centralizing end is positioned immediately adjacent to the narrow end of said truncated conical measuring surface and coaxial therewith.

5. The measuring device of claim 4 wherein said probe further comprises a circumferential lip at the wide end of said conical measuring surface adapted to contact said foot means and arrest movement of said probe through the central aperture of said foot thereby retaining said probe within the hollow body.

6. The measuring device of claim 3 wherein the included angle of said truncated conical measuring surface is less than the angle of taper of the countersunk portion of said hole so that contact between said measuring surface and the countersink hole being measured only occurs at the intersection of the straight sidewall portion of the hole and the tapered portion of the hole.

7. The measuring device of claim 4, wherein said measuring surface comprises a fluted head tapering to a point from a circumferential ring located at the juncture between said head and said elongated collet holder. said head including at least three flutes and at least three raised ridges extending from said circumferential ring to an apex.

8. The measuring device of claim 4, wherein said measuring surface comprises a fluted truncated cone the base of which comprises a circumferential ring located at the juncture of said truncated cone and said elongated collet holder, said truncated cone including at least three flutes and separating ridges.

9. The measuring device of claim 1, wherein said stem gauge includes analog display means for displaying the absolute depth of the tapered portion of a hole having both said tapered and said straight sidewall portions.

10. The measuring device of claim 1, wherein said stem gauge includes analog display means for displaying the relative difference in the depth of said tapered portions of holes having both said tapered and said straight sidewall portions.

11. The measuring device of claim 6, wherein the included angle of said truncated conical measuring surface is from about 50° to about 110°.

12. The measuring device of claim 1, further comprising means for measuring the depth of countersink of a hole through a template.

13. The measuring device of claim 6, wherein the included angle of said measuring surface is from about 50 to about 99 degrees.

14. The measuring device of claim 6, wherein the included angle of said measuring surface is from about 50 to about 89 degrees.

* * * * *